Figure 1:
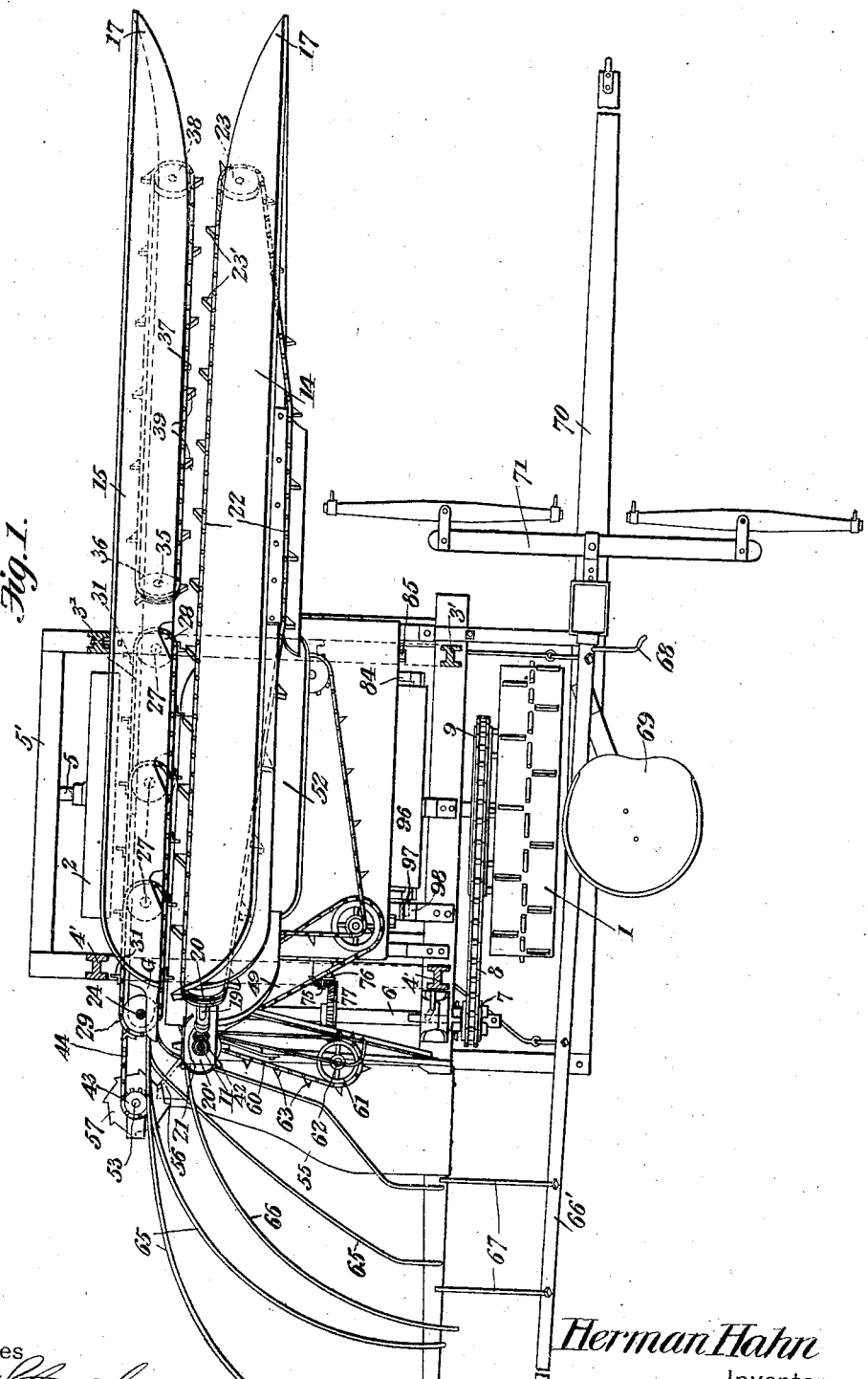

No. 880,139.

PATENTED FEB. 25, 1908.

H. HAHN.
CORN HARVESTER.
APPLICATION FILED MAY 20, 1907.

4 SHEETS—SHEET 1.

Witnesses

*Herman Hahn*
Inventor by *C. A. Snow & Co*
Attorneys

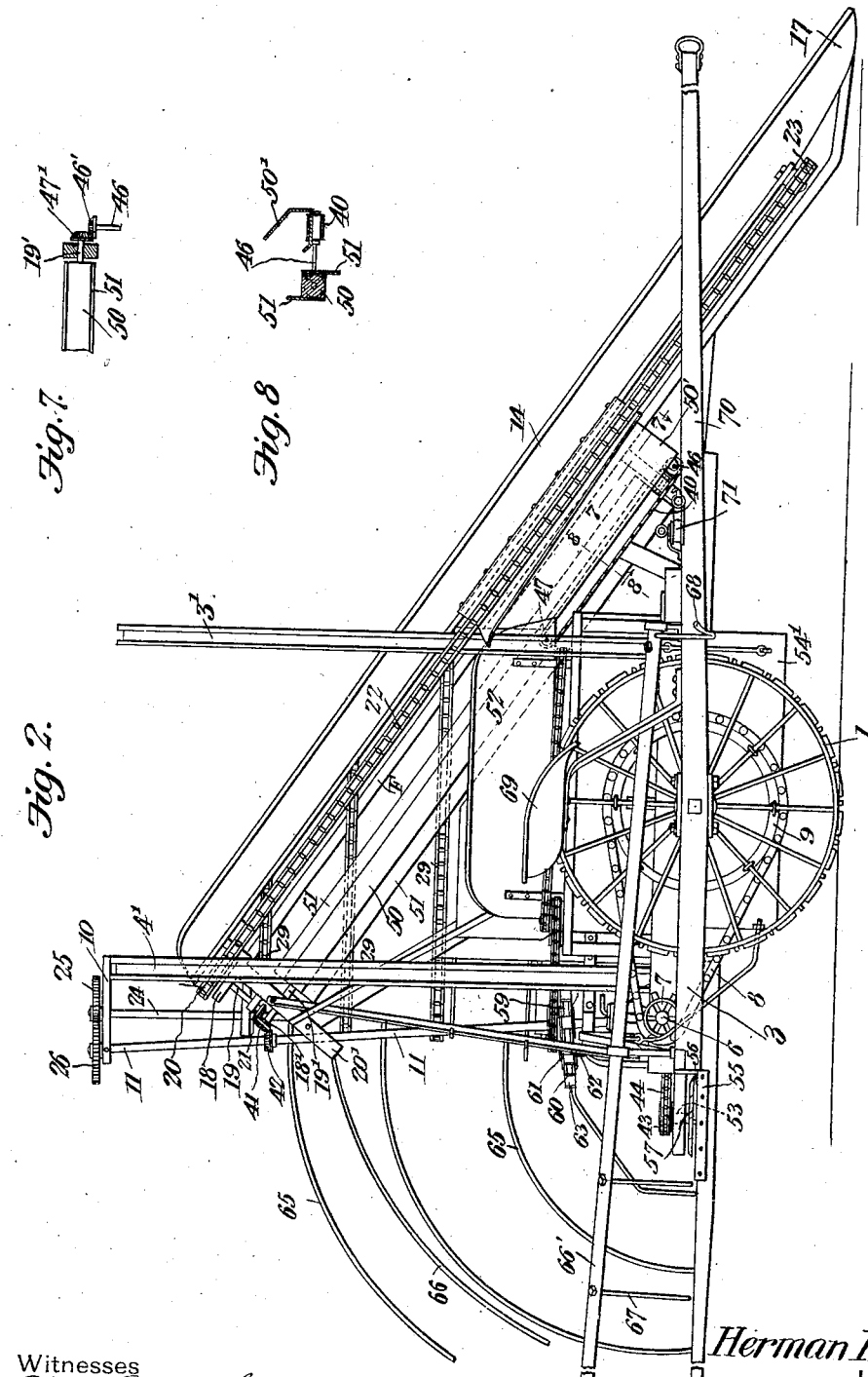

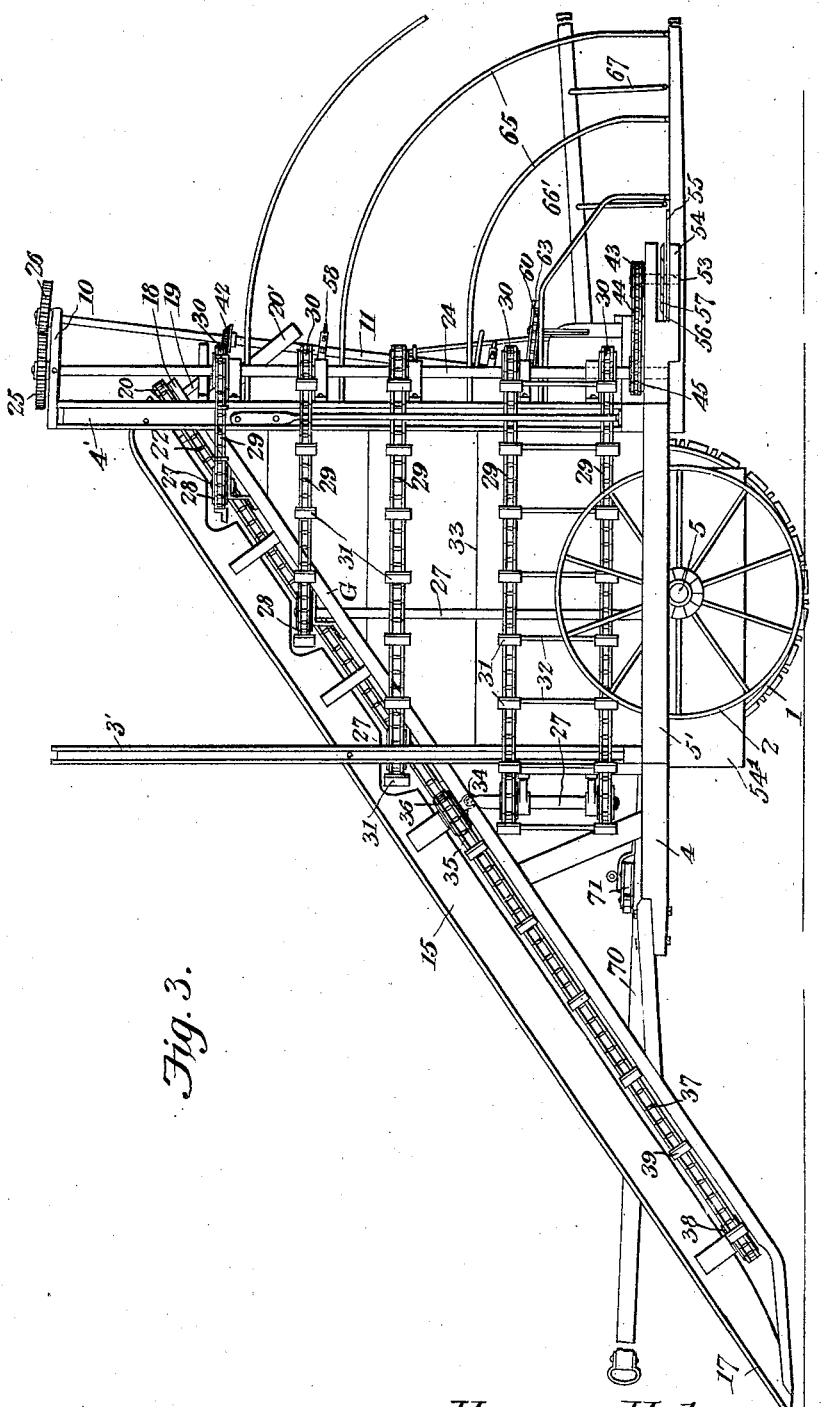

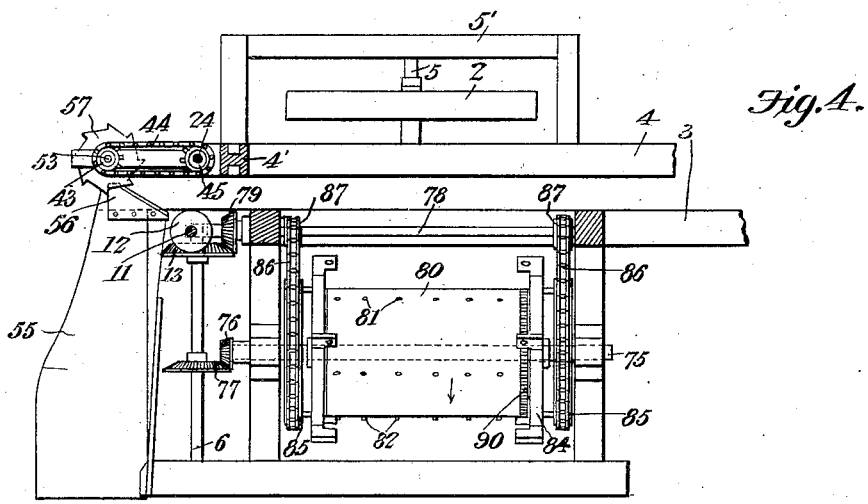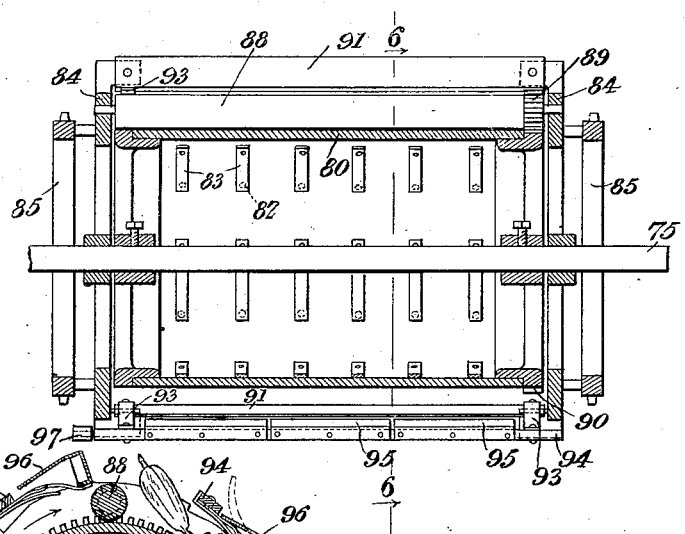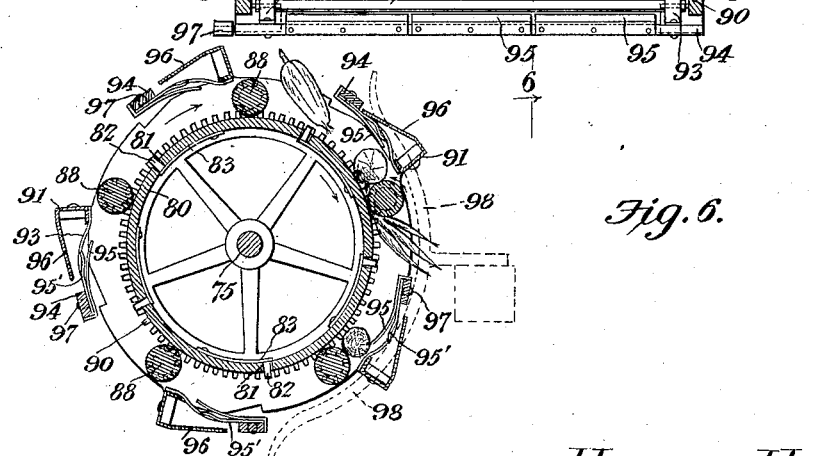

UNITED STATES PATENT OFFICE.

HERMAN HAHN, OF NAPOLEON, OHIO.

CORN-HARVESTER.

No. 880,139.   Specification of Letters Patent.   Patented Feb. 25, 1908.

Application filed May 20, 1907. Serial No. 374,699.

*To all whom it may concern:*

Be it known that I, HERMAN HAHN, a citizen of the United States, residing at Napoleon, in the county of Henry and State of Ohio, have invented a new and useful Corn-Harvester, of which the following is a specification.

This invention relates to corn-harvesters and it has particular reference to that class of harvesters which operate primarily to detach the ear from the stalk, and secondarily to cut or sever the stalk at a suitable distance above the ground; the ears being conveyed through a husking mechanism, whereby they are deprived of the husks, and into a receptacle from which, at intervals, they may be discharged; and the stalks being conveyed to a buncher or carrier where they are permitted to remain until a bundle of sufficient size has been accumulated, when they may be discharged upon the ground.

The objects of the invention are to simplify and improve the construction and operation of this class of machines; and with these and other ends in view, which will readily appear as the nature of the invention is better understood, the same consists in the improved construction and novel arrangement and combination of parts, which will be hereinafter more fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be made when desired.

In the drawings, Figure 1 is a top plan view, partly in section, of a corn harvesting machine constructed in accordance with the principles of the invention. Fig. 2 is a side elevation. Fig. 3 is a side elevation taken from the opposite side. Fig. 4 is a detail plan view of a portion of the frame illustrating the cutting apparatus. Fig. 5 is a sectional view taken longitudinally through the husking device. Fig. 6 is a transverse sectional view of the husking device taken on the plane indicated by the line 6—6 in Fig. 5. Fig. 7 is a sectional detail view taken on the plane indicated by the line 7—7 in Fig. 2. Fig. 8 is a sectional detail view taken on the plane indicated by the line 8—8 in Fig. 2.

Corresponding parts in the several figures are indicated throughout by similar characters of reference.

The frame of the improved machine is supported upon a bull wheel 1 and a grain wheel 2, which are suitably mounted at opposite sides of the frame. The latter includes a pair of longitudinal beams 3 and 4, which are spaced apart for the admission between them of stalks of corn that are to be operated upon, said beams being securely connected together by means including a pair of arches, 3', 4', sufficiently high to permit cornstalks to pass thereunder; the axle or shaft 5 carrying the grain wheel 2 is supported in boxes or bearings upon the under side of the longitudinal beam 4 and of a beam 5' supported adjacent thereto.

Supported in suitable bearings upon the rear portion of the frame is a transversely disposed horizontal shaft 6 having a sprocket wheel 7 which is connected by a chain or link belt 8 with a sprocket wheel 9, which latter is secured upon the bull wheel 1, so as to rotate with the latter, thus transmitting motion to the shaft 6. The rear arch 4' carries a bracket 10 affording a bearing for the upper end of the shaft 11, the lower end of which may be stepped or journaled in the frame beam 3; the shaft 11 has a bevel pinion 12 meshing with a bevel pinion 13 upon the driven shaft 6.

Suitable supporting means are provided for a downwardly and forwardly inclined guide board 14 the mate to which, 15, is supported by the arches 3', 4'. The guide boards 14 and 15 terminate at their lower ends in divergent gathering points 17 between which the stalks will be readily guided to be operated upon by the machine; the inclined guide boards and the gathering points or prongs presenting smooth and unbroken surfaces which will be efficient in guiding down corn to an upright and standing position, so that the ears without fail may be detached by the mechanism provided for the purpose.

The right and left guide boards 14 and 15 will be understood as being supported upon right and left vertical frame structures F and G having as their bases the longitudinal beams 3 and 4, and including the right and left limits of the arches 3' and 4'.

The guide board 14 is provided with a bracket 18 affording a bearing for the upper end of a shaft 19 carrying a sprocket wheel 20, and the lower end of which has a bevel pinion 21 meshing with a bevel pinion 18' upon a shaft 19' supported in bearings, as 20', upon the underside of the guide board 14. The sprocket wheel 20 is for the purpose of driving a gathering chain 22, the lower end of which is guided over a suitably supported sprocket wheel 23. The links of the gathering chain, or some of the links of said chain, are provided with outwardly extending stalk engaging fingers 23'.

The bracket 10 and the frame beam 4 are provided with bearings for a vertical shaft 24 having at its upper end a pinion 25 meshing with a pinion 26 upon the shaft 11, from which motion is thus transmitted to the said vertical shaft 24. A plurality of shafts 27, parallel to the shaft 24, are supported in suitable bearings, and said shafts are equipped with sprocket wheels, as 28, located in various horizontal planes and connected by chains 29 with sprocket wheels 30 upon the shaft 24 whereby the horizontally disposed chains are driven. Said chains 29 are provided at intervals with stalk engaging lugs 31, and the two lowermost chains are connected together by means of vertically disposed rods 32. A vertical wall 33 is provided between the inner and outer leads of the chains 29, the inner leads of which serve to engage the corn stalks, as will be readily understood.

The shaft 27, which is disposed nearest the front end of the machine, is connected at its upper end, by means of a knuckle joint 34, with an inclined shaft 35 carrying a sprocket wheel 36, which is connected by a chain 37 with a sprocket wheel 38 supported for rotation near the lower end of the guide board 15. The chain 37, the links of which are provided at intervals with corn engaging fingers 39, coöperates with the chain 22 to lift the down corn and to move the stalks in a rearward direction between the frame beams 3 and 4, and the devices supported upon said frame beams, as the machine advances. When the stalks pass out of engagement with the chain 37, they will be laid hold of by the horizontally disposed chains 29 which tend to move the stalks in a rearward direction, while, on the opposite side, they will still remain engaged by the inclined chain 22, the tendency of which is to straighten the stalks in an upward direction so that the ears will be presented to the action of the ear detaching mechanism.

The shaft 19' which is supported below and parallel to the guide board 14, carries a bevel gear 41 meshing with and receiving motion from a bevel pinion 42 upon the shaft 11. The shaft 19' carries an ear detaching member 50, which is preferably square in cross section and provided on opposite sides with oppositely extending flanges 51, which, as the shaft carrying the ear detaching member is rapidly rotated, serves to engage the butts of the ears and strike the latter in an upward direction, thus detaching them from the stalks and causing the greater number of said ears to drop into a suitably supported hopper 52 whereby they are conveyed to the husking mechanism, which will be presently more fully described. Such of the ears as do not drop directly into the hopper 52 will drop onto an endless conveyer 40 supported by drum carrying shafts 46 and 47, the former of which has a bevel pinion 46' meshing with a bevel pinion 47' at the lower end of the shaft 19' from which the endless conveyer will thus be driven. The endless conveyer 40 moves within a trough 50'. Such ears as happen to be detached from the stalks near the ground will obviously drop onto the endless conveyer and will be elevated by the latter into the hopper 52.

The frame beams 3 and 4 support at their rear ends a cutting apparatus which includes a stationary knife or cutter 56 and a rotary cutter 57 coöperating therewith; said rotary cutter being shown as mounted upon a shaft 53 journaled near the rear end of the frame beam 4, which latter is bifurcated, as shown at 54, for the accommodation of said rotary cutter and of a flooring plate 55, which latter directly supports the stationary cutter 56. The cutter carrying shaft 53 has a sprocket wheel 43 which is connected by means of a chain 44 with a sprocket wheel 45 upon the lower end of the shafts 24, from which the rotary cutter will thus be driven, as will be readily understood. The stalks that are severed by the cutting apparatus are discharged at the rear end of the guiding devices.

Near the lower end of the shaft 11 is a sprocket wheel 59 which is connected by a chain 60 with a sprocket wheel 61 upon a suitably supported shaft 62; the chain 60 being provided with stalk engaging fingers 63 which engage the corn stalks near the butt ends of the latter and serve to move them transversely across the floor 55 at the rear end of the machine. Suitably curved stalk guides 65 and 66 are connected with the frame of the machine, said guides serving to tilt the stalks onto a cradle or stalk carrier comprising a rock shaft 66' having arms 67 and equipped with a treadle 68 whereby it may be controlled by the foot of the driver so as to dump the stalks after a sufficient quantity has been accumulated.

The frame of the machine is provided with bearings for a longitudinally disposed shaft 75 having a bevel pinion 76 meshing with a bevel gear 77 upon the driven shaft 6. Supported parallel to the shaft 75 is another shaft 78 having a bevel pinion 79 that meshes with the bevel 13 upon the driven shaft 6 from which rotary motion will thus be transmitted to the shaft 78; the shafts 75 and 78 being driven in the same direction. The shaft 75 carries a cylinder 80 having rows of apertures 81 for the passage of pins or pegs 82 which are supported by means of springs 83 interiorly of the cylinder; the arrangement being such that the pins or pegs 82, which are normally caused by their supporting springs to project slightly beyond the outer surface of the cylinder, are capable of being readily forced in an inward direction by external pressure. The shaft 75 carries a pair of rings or spiders 84 with which are connected sprocket wheels 85 that are driven by means of chains 86 engaging sprocket pinions 87 upon the shaft 78; the spiders 84 are provided with bearings for a plurality of husking rollers 88 which are disposed in series concentric with the axis of the shaft 75 carrying the cylinder 80; the rollers 88 being disposed for contact with said cylinder. The rollers 88 have pinions 89 meshing with a gear wheel 90 which may constitute one of the heads or ends of the cylinder 80. The latter is driven at a considerably greater speed than the spiders carrying the rollers 88. The spiders 84 are connected by means of cross bars 91 having arms 93 made of spring steel or other suitable resilient material, said arms carrying cleats 94 provided with flat resilient plates or springs 95 extending in the direction of the cross bars 91 and constituting ear holding devices. The cross bars 91 are provided with flanged guard plates 96 extending in the direction of the cleats 94 and serving to limit the outward movement of the latter. The cleats 94 are provided with terminal rollers 97 adapted to be engaged by a cam member 98 which is suitably connected with and supported by the frame of the machine, and whereby the cleats 94 and related parts may be forced in the direction of the cylinder 80.

The cylinder 80 and related parts constituting the husking device are disposed beneath the hopper 52 in such a position that ears falling into said hopper will be discharged directly onto the face of the cylinder 80 at a point where the latter is exposed. As the cylinder and related parts are operated in the direction of the arrows in Figs. 4 and 6, the corn holding devices will close upon the ears owing to the anti-friction rollers 97 of the cleats 94 passing into engagement with the cam member 98, and the pins or pegs 82 of the cylinder 80 will be depressed against the tension of the springs 83, by contact with the rollers 88, thus causing the husks to become loosened upon the ears and seized between the cylinder 80 and the rollers 88, whereby the husks will be torn from the ears and dropped upon the ground. When the cleats 94, or the anti-friction rollers upon said cleats, pass out of engagement with the cam member 98, the holding members will release the ears and the latter will be suffered to drop into a box or receptacle 54' which is supported beneath the frame of the machine in such a manner as to be capable of being tilted when desired, for the purpose of discharging its contents in a pile upon the ground.

A seat 69 for the driver is suitably supported upon the frame of the machine; and a draft attachment is provided, including a tongue 70 and an equalizer 71.

From the foregoing description, taken in connection with the accompanying drawings, the operation and advantages of this improved machine will be readily understood by those skilled in the art to which it appertains. As the machine advances over the field, the row of corn stalks will be guided between the guide boards 14 and 15, and the stalks will be straightened and moved in a rearward direction by the chains having the stalk engaging gathering fingers. The rotary ear detaching member being arranged in an inclined position, the ears will unfailingly be engaged thereby, no matter at what height they are found upon the stalks, and each ear will be struck a quick blow by one of the flanges 51 of the detaching member, whereby it is carried in an upward and outward direction over said detaching member, the flanges of which coöperate with the body thereof to form trough-like recesses whereby the ears will be carried over the detaching member and deposited in the hopper 52 to be operated upon by the husking device. The stalks will be severed by the cutting mechanism and deposited upon the carrier from which they may be dropped upon the ground when a bundle of sufficient size has been accumulated.

Having thus described the invention, what is claimed is:—

1. In a corn harvester, a pair of longitudinal frame beams spaced apart, vertical frame structures upon said beams including connecting arches, downwardly and forwardly inclined guide boards supported upon the frame structures and terminating in gathering prongs at their lower front ends, and endless chains having stalk engaging fingers supported adjacent to said guide boards.

2. In a corn harvester, a pair of longitudinal frame beams spaced apart, vertical frame structures upon said beams, downwardly and forwardly inclined guide boards supported upon said frame structures, a plurality of vertical shafts supported by one of the frame structures, a plurality of horizontal chains supported by said shafts and having stalk engaging fingers, and an inclined gathering chain supported upon the opposite frame structure and having stalk engaging fingers.

3. In a corn harvester, vertical frame structures coöperating to form a stalk passage, driven chains supported upon said frame structures and having stalk engaging fingers, a hopper supported adjacent to one of the frame structures, and an ear detaching member supported for rotation by the latter frame structure and having ear engaging flanges adapted to move the ears over said detaching member and into the hopper.

4. In a corn harvester, vertical frame structures coöperating to form a stalk passage, driven chains supported by said frame structures and having stalk engaging fingers, one of said chains being supported in an inclined position and extended the entire length of its supporting structure, an ear receiving hopper arranged adjacent to the latter frame structure, and an ear detaching member supported for rotation in said frame structure and provided on opposite sides of its axis with ear engaging flanges adapted to move the ears over said detaching member and into the hopper.

5. In a corn harvester the combination with a receptacle; of an ear detaching member supported for rotation and consisting of a body provided on opposite sides of its axis with oppositely extending flanges, said body extending above and below and overhanging the receptacles, a trough extending from one end and below the receptacle, and a conveyer within the trough for conveying to the receptacle ears detached below the receptacle.

6. In a corn harvester the combination with an inclined ear detaching member supported for rotation; of an ear receptacle supported adjacent and at a point between the ends of and overhung by the detaching member to receive ears detached above said receptacle, and means adjacent the detaching member and extending from one end of the receptacle for conveying upwardly to the receptacle ears detached below the receptacle.

In testimony that I claim the foregoing as my own, I have hereto affixed my signature in the presence of two witnesses.

HERMAN HAHN.

Witnesses:
  FRED BORSTELMAN,
  W. A. BOCKELMAN.